Nov. 8, 1932.   P. L. TENNEY ET AL   1,886,847

UNIVERSAL JOINT

Filed April 2, 1927

Inventors
Perry L. Tenney
Harry E. Fidler

By Blackmore, Spencer & Hill
Attorneys

Patented Nov. 8, 1932

1,886,847

UNITED STATES PATENT OFFICE

PERRY L. TENNEY AND HARRY E. FIDLER, OF MUNCIE, INDIANA, ASSIGNORS TO GENERAL MOTORS CORPORATION, OF DETROIT, MICHIGAN, A CORPORATION OF DELAWARE

UNIVERSAL JOINT

Application filed April 2, 1927. Serial No. 180,573.

This invention relates to improvements in universal joints particularly those used in propeller shafts of motor vehicles.

Universal joints similar to the disclosure of the present invention are known, but have been subject to manufacturing difficulties which involved added expense. It is the purpose of the present invention to produce a universal joint having features which are set out below, whereby the manufacturing costs will be reduced and a universal joint produced which will be equally as efficient as the joints of the prior constructions.

The universal joint of the present invention consists of relatively movable members with a series of balls (preferably six in number) interposed therebetween to allow for an easy and smooth motion. One member has a shank portion, the end of which is spread out so as to form a plurality of arms or prongs, the outer surfaces of which form a portion of a sphere. The second member has no shank portion but instead is provided with a flat toothed or gear member the periphery of which is interrupted at a number of points so as to form segments of a toothed surface. Integral with this flat toothed member is the second or co-operating part of the universal joint. This co-operating member has a plurality of projecting arms or prongs which interfit in the spaces between the arms of the shank member and whose outer surfaces form a portion of a sphere coincident with the spherical portion of the shank member.

The adjacent faces of the arms or prongs of both parts of the joint are provided with semi-cylindrical ball races or grooves inclined to the axis of the respective shank and gear members. The grooves or races of one member are inclined with reference to those of the other so that in their final assembly they will cross on a diameter of the sphere formed by the two interfitting members of the joint. Balls of a size to correspond to the grooves rest at the crossing points thereof so that when in asssembled relation they act as retaining members between the parts of the joint.

When the centre lines of the two parts of the joint coincide, the balls will lie in a plane at right angles thereto and as one member of the joint assumes an angualr relation with reference to the other, this plane will remain stationary but the balls will move in the slots proportional to the angular movement. The balls themselves act as torsion transmitting members as well as performing the function of permitting free and easy turning.

The principal features of the present invention are three in number. (1) A modification of the straight race type of joint allowing the ball races to be machined straight through with a milling cutter, and then ground after hardening with a large diameter wheel; (2) the elimination of the large ball which customarily has been placed on the one member and received by the other substantially at the centre of the sphere so as to form a thrust member, and providing in place thereof a steel collar welded or otherwise retained on the steel ball race member, this collar forming surfaces for both forward and rearward thrust; (3) the provision of a segmental gear member and an internally toothed ring surrounding the gear and meshing therewith. This latter construction provides a driving means, as well serving as an oil retaining member and also acts as a rear thrust member.

To the shank member of the joint there is rigidly secured, preferably by welding, a steel collar, the inner spherical surface of which is in close contact with the spherical surface of the joint and the outer spherical surface of which is engaged by a covering surface or housing attached by means of an integral flange to the internally toothed ring member and to an outwardly projecting annular flange on a hub member surrounding the drive shaft. This collar is so positioned that it will take up both forward and rearward thrusts of the shaft. The forward thrust will be transmitted by the collar to the spherical surface of the second joint member and the rearward thrust to the casing or housing member.

The invention is disclosed in the accompanying drawing in which.

Figure 1:
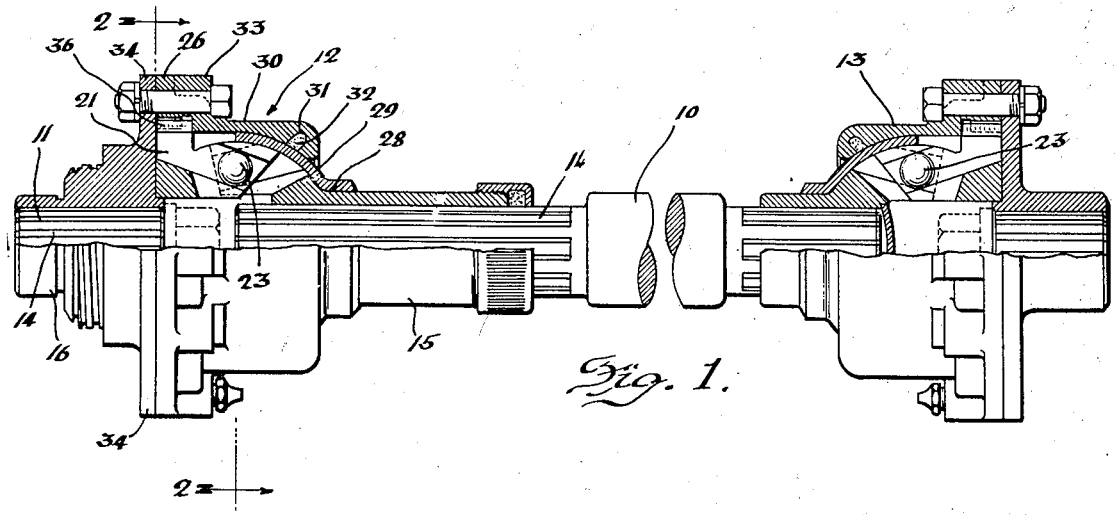
Figure 1 is a view in elevation of a propeller shaft with the universal joints of the present invention applied thereto, parts being shown in section for purposes of clearer illustration.

Referring to the numbered parts of the drawing, 10 designates the propeller shaft of an automobile, 11 the drive shaft, 12 the universal joint at the front and 13 the universal joint at the rear of the shaft. The shafts 10 and 11 have the usual teeth 14 to rigidly secure the internally toothed portion of the shank member 15 and the hub 16.

Figure 3:
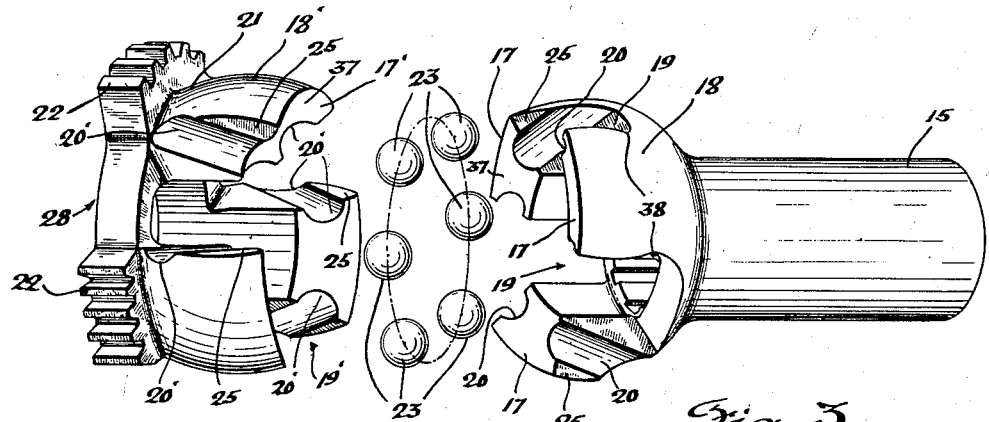
Figure 3 is an expanded view of the parts of the novel joint per se separated from the rest of the structure.

By referring to Figure 3 it will be noted that the shank or driven member 15 has its end spread out into a plurality of arms or prongs 17, preferably three in number, the bases of which are suitably countersunk as indicated at 38 and the outer surfaces of which form portions of the sphere 18. The arms or prongs are equally spaced with reference to the circumference of the sphere and accordingly allow for uniform spaces or recesses 19 therebetween. The sides of each arm are provided with semi-cylindrical races or grooves 20 which are inclined to the axis of the shank and preferably diverge from a point in front of the sphere on the center line extended of the shank member.

These grooves extend diagonally across the faces of the arms 17 and in this particular are similar to those of the prior constructions; however, use is made of an interrupted gear, the interruptions or cut-out segments conform to the inclined grooves which structure is of considerable importance from a manufacturing standpoint for it allows the ball races or grooves to be machined straight through with a milling cutter and then ground after hardening with a large diameter wheel bringing about considerable economy in manufacture.

The gear or toothed member or multiple slotted engaging portion of the universal joint is indicated at 21 and comprises the interrupted gear 22 and the spherical portion 18', the diameter of which corresponds to the diameter of the sphere 18 of the shank member. The spherical portion 18' consists of a plurality of arms 17', preferably three in number, having spaces or recesses 19' between them. The arms 17' have semi-cylindrical inclined grooves or races 20', similar to the grooves 20 of the shank member 15 but inclined in the opposite direction, that is, they diverge in a direction opposite to that of the grooves 20.

By referring to Figure 3, it will be seen that if the grooves 20' are projected, they will pass through the spaces 28 of the member 21 without cutting the gear portions 22. The grooves therefore conform to the spaces or interrupted portions and this structure permits of a cutting tool readily passing along the lateral surface of the arms 17' to form the grooves 20' without injuring or cutting the gear portion 22.

The arms 17' of the gear member interfit in the spaces or recesses 19 of the shank member 15, and the arms 17 of the driven member interfit in the recesses 19' of the gear member 21. When the two parts of the joint are in their assembled or interfitting position their forked ends form a sphere and have their respective grooves 20 and 20' crossing each other. In these grooves the balls 23 are placed and rest at the place of intersection. The diameter of the balls of course, is such as will be accommodated by the grooves and in final assembly, as shown in the sectional portion of Figure 2, a suitable space 24 is allowed between the respective arms of the driving and driven portions of the joint to allow for relative intermovement.

Referring further to Figure 3 it will be noted that the sharp edges of the arms 17 and 17' have been bevelled as indicated by the numeral 25, the purpose of which is to allow for an easy interfitting of the parts and a better working of the universal joint.

Welded to the shank member 15 at 28 and closely embracing the sphere 18—18' is a metallic member or collar 29 preferably of steel, but the connection is not such an intimate one but that free movement of the collar over the gear member 21 will be allowed. This collar terminates substantially at the central vertical plane of the sphere and is bell shaped to conform to the spherical joint. The thrust of the member 21 to the right or the member 15 to the left will be transmitted to the interior of the bell shaped portion.

Surrounding the collar and closely embracing the same, is a conformably shaped housing 30 having a groove 31 containing a packing 32 to prevent the escape of lubricant or the entrance of foreign matter. An outwardly extending annular flange 33 having a plurality of bolt openings is provided at the free edge of the housing. The thrusts of the member 21 to the left or member 15 to the right are taken by the bell shaped portion through the intermediary of the housing 30.

The driving member 21 is surrounded by an internally toothed driving ring 26 having a plurality of bolt openings. The ring 26 together with the space 28 between the segments 22 of the driving member 21 forms a pocket for the retention of a lubricant. In assembled relation the ring 26 fits over the gear 22 and the drive from the shaft 11 is transmitted through the hub 16 and ring 26 to the driving member 21 through the intermeshing teeth as shown at 33 in Figure 2.

The hub portion 16 is provided with an outwardly extending annular flange 34 having a plurality of bolt openings and bolts 35 are passed through the openings in the flanges 33 and 34 and those of the gear ring 26 to rigidly hold the parts together.

Figure 2:
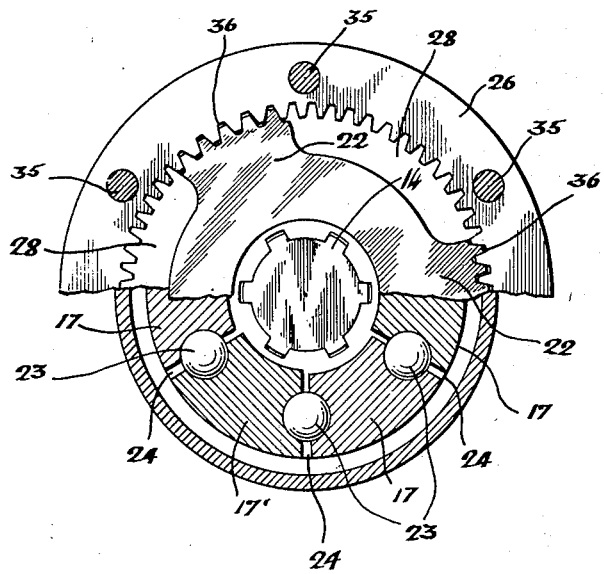
Figure 2 is a section on the line 2—2 of Figure 1.

The operation of the joint is as follows:—
The gear and shank members and the balls are brought together in their relative positions in any suitable manner, their final assembled position being indicated in Figures 1 and 2. The gear member 21 is substantially stationary at all times with reference to the shank member due to its rigid connection with the transmission which in turn is rigidly connected to the chassis frame. Now assuming that an upward motion is communicated to the rear end of the shaft 10, then a corresponding movement of the shank member 15 will take place. As the driving portion 21 is substantially stationary the driven portion 15 will move with reference thereto, with the center of the sphere 18—18' as the turning point. The grooves 20 will ride over the balls 23, the balls then being positioned further toward the shank end of the driving member at the upper grooves and toward the sphere end in the lower grooves. The rotary motion of the shaft is transmitted from the arms 17' to the arms 17 through the intermediary of the balls 23.

We claim:

1. A universal joint comprising in part a member having an interrupted gear or multiple slotted engaging portion, and arms projecting from said gear or multiple slotted engaging portion.

2. The combination of claim 1, and inclined grooves on said arms.

3. The combination of claim 1, said arms being integral with said gear, and diagonal grooves entirely across the faces of said arms.

4. A universal joint comprising in part a hollow member consisting of an interrupted gear portion, a plurality of integral equally spaced arms extending from one face of said gear portion, and diagonal grooves extending entirely across the faces of said arms, the spacing of said arms corresponding to the spaces on the interrupted gear.

5. A universal joint comprising in part a hollow member, a shank at one end and a plurality of integral equally spaced arms at the other end of said member, and diagonal grooves extending entirely across the faces of said arms.

6. In a universal joint, a member having a plurality of arms and an interrupted annular portion, said arms having grooves the projected channel of which passes through the spaces of the interrupted annular portion.

7. In a universal joint having a plurality of movable members, interfitting arms on said members, and grooves running entirely across the adjoining faces of said arms and having balls positioned therein.

8. In a universal joint, a plurality of members adapted for relative intermovement, interfitting prongs or arms on said members, a straight line groove across the adjacent faces of each arm, and a ball in each pair of adjacent grooves.

9. In a universal joint, a plurality of members adapted for relative intermovement, interfitting prongs or arms on said members, straight line intersecting grooves across the adjacent faces of each arm, and a ball at the intersection of each pair of grooves.

10. In a universal joint, a plurality of members adapted for relative intermovement, interfitting prongs or arms on said members, a straight line groove entirely across the adjacent faces of each arm, the grooves of each member diverging in opposite directions with the diverging projection of the grooves passing through no other part of the members, and a ball in each pair of grooves.

In testimony whereof we affix our signatures.

PERRY L. TENNEY.
HARRY E. FIDLER.